United States Patent [19]

Csengery

[11] Patent Number: 4,502,142
[45] Date of Patent: Feb. 26, 1985

[54] APPARATUS FOR DETECTING ERRORS IN A DIGITAL DATA STREAM ENCODED IN A DOUBLE DENSITY CODE

[75] Inventor: Ladislao C. Csengery, Woodbridge, N.J.

[73] Assignee: Lockheed Electronics Company, Inc., Plainfield, N.J.

[21] Appl. No.: 415,695

[22] Filed: Sep. 7, 1982

[51] Int. Cl.³ .................... H03K 13/24; H03K 13/32
[52] U.S. Cl. ................................................. 371/55
[58] Field of Search .......................... 371/22, 48, 55

[56] References Cited

U.S. PATENT DOCUMENTS

| | | | |
|---|---|---|---|
| 3,156,893 | 11/1964 | Harel | 371/55 |
| 3,405,235 | 10/1968 | Carter | 371/55 X |
| 3,524,164 | 8/1970 | Cox et al. | 371/55 |
| 3,744,023 | 4/1973 | Carpetier et al. | 371/55 |
| 4,122,441 | 10/1978 | Robinson et al. | 371/6 |
| 4,309,694 | 1/1982 | Henry | 371/55 X |

Primary Examiner—Jerry Smith
Assistant Examiner—M. Edward Ungerman
Attorney, Agent, or Firm—Hopgood, Calimafde, Kalil, Blaustein & Judlowe

[57] ABSTRACT

In the decoding of a data stream encoded in a Miller type code the number of intermediate duration transition intervals are counted between successive transition intervals of long duration. Whenever an odd number of intermediate duration transition intervals are detected between successive transition intervals of long duration, an error signal is produced. The error signal is developed by two gates utilizing signals otherwise present in the decoding apparatus.

7 Claims, 4 Drawing Figures

APPARATUS FOR DETECTING ERRORS IN A DIGITAL DATA STREAM ENCODED IN A DOUBLE DENSITY CODE

BACKGROUND OF THE INVENTION

The present invention relates to real-time error detection systems and, more particularly, to systems for detecting errors in certain types of encoded binary data.

In the field of digital data error detection, parity error checking schemes are well-known and widely utilized. However, such parity checking schemes generally require the use of an additional parity bit that is added to a string of "1" and "0" bits. Traditionally, the "1" bits are counted in a particular length or string of bits which make up a segment or computer word. If the odd parity system is being utilized, then the number of "1" bits in every computer word must be odd. If the particular coding of a particular computer word provides an even number of "1" bits, a binary "1" parity bit is added. If the particular coding of a particular computer word provides an odd number of "1" bits, then a "0" parity bit is added.

There are many variations of the foregoing scheme for detecting errors, but all have the significant characteristic that bits are added to the data to generate a predictable pattern and the errors are detected as violations of the pattern that is predicted. The added bits are referred to as overhead and an increased overhead increases the bandwidth required to process the data. Therefore, such techniques are not completely desirable.

In U.S. Pat. No. 4,122,441 entitled "Error Detection and Indication System for Bi-Phase Encoded Digital Data", issued Oct. 24, 1978 to Robinson et al, and assigned to the same assignee as the subject application, there is disclosed a real-time error detection system for bi-phase or similarly encoded digital data. Bi-phase or similarly encoded data is characterized by having two transitions in a bit cell for either a binary "1" or a binary "0" value, and one transition in a bit cell for the other binary value. Such encoding inherently generates an even number of transitions corresponding to the binary value represented by the two transitions between each occurrence of the other binary value represented by one transition. Monitoring for the number of transitions of the binary value represented by two transitions provides an indication upon the occurrence of an odd number of transitions. This represents an error condition. The described system utilizes a logic circuit responsive to the binary "1" and binary "0" data clock retrieved from the self-clocking bi-phase encoded data. When an error condition is detected, an error indication signal is generated.

In addition to the bi-phase codes for encoding binary data and which are characterized by having two transitions in a bit cell for a selected binary value, there are a number of codes known as double density such as the one known as Miller in which there is never more than one transition in a given bit cell. Such codes cannot be processed by the error detection system described in said Robinson et al. patent. Because double density codes permit twice the data content in a channel of a given bandwidth than bi-phase codes, extensive use is made of the former. Thus, there is an important need for an error detecting system capable of real-time error detection when applied to double density Miller or similarly encoded binary data.

SUMMARY OF THE INVENTION

In accordance with the present invention there is provided a real-time error detection system for double density Miller or similarly encoded binary data wherein, during decoding of the waveform containing said data, signals are generated indicative of the intervals between successive transitions of said waveform, which intervals for an error-free waveform are of short, intermediate or long duration related in the ratio of 2:3:4, said error detection system comprising in combination means having a first and a second operable state and coupled to alternate between said states responsive to each detection in said waveform of a transition interval corresponding to said intermediate duration, means for ensuring that said first mentioned means is in said first state in response to each detection in said waveform of a transition interval corresponding to said long duration, and means for generating an error signal whenever said first mentioned means is in said second state at the time of detection of a transition interval corresponding to said long duration.

BRIEF DESCRIPTION OF THE DRAWINGS

The invention will be better understood after reading the following detailed description of the presently preferred embodiment thereof with reference to the appended drawings in which.

The same reference numerals are used throughout the drawings to designate the same or similar parts.

DETAILED DESCRIPTION OF THE PREFERRED EMBODIMENT

Figure 3:
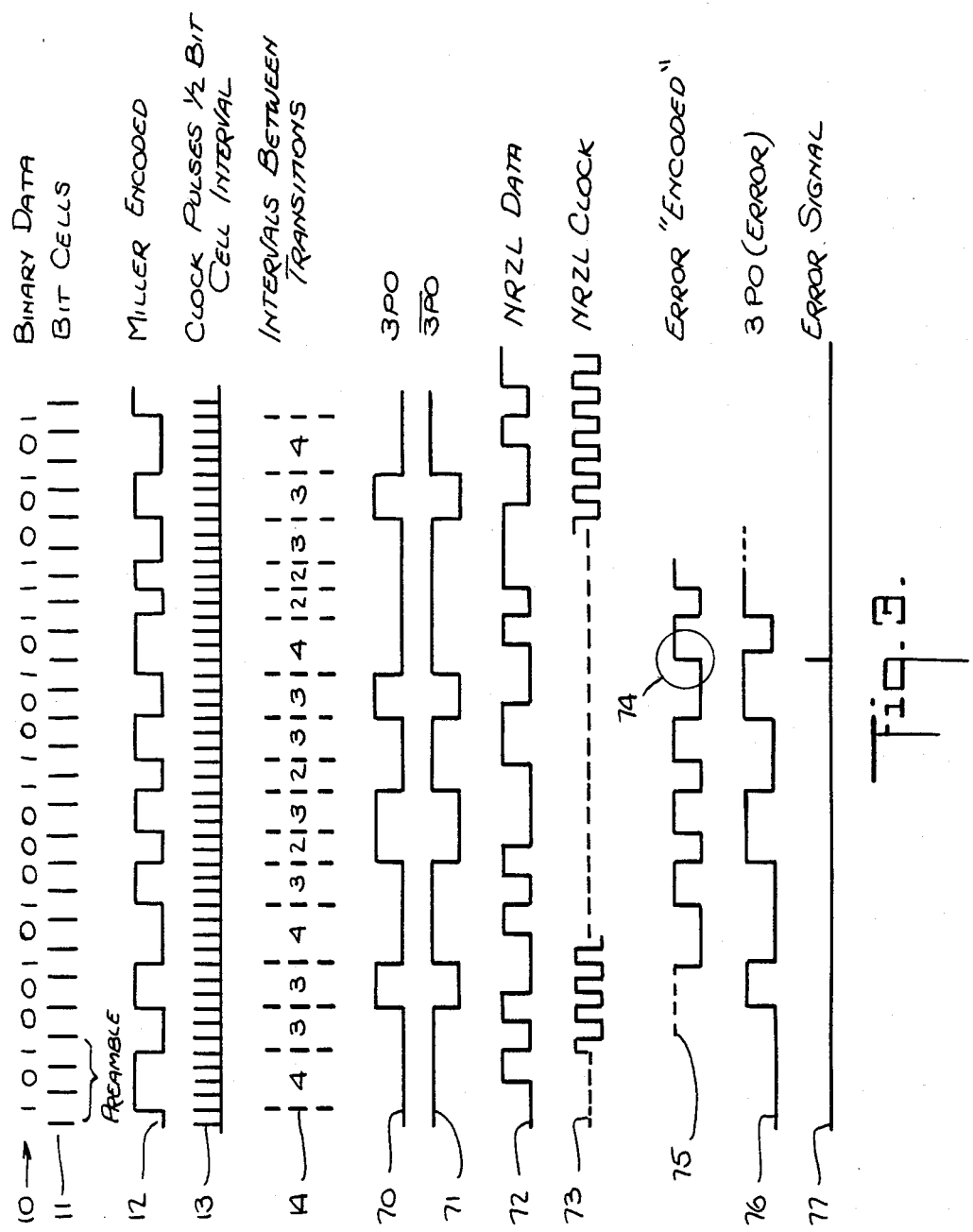
FIG. 3 is a series of waveforms for describing a further aspect of the operation of the circuit of FIG. 1.

Before proceeding with a discussion of specific apparatus it will be useful to review the nature of the Miller code and others of that class. Referring to FIG. 3, an arbitrary data bit stream is indicated at 10. Immediately below the stream 10 is shown the boundaries, 11, of the bit cells for each data bit. In line 12 is shown the Miller encoded pulse train for the bits 10. The encoding rules for the Miller code specify that each "1" has a transition at the middle of a bit cell while a "0" has a transition at the start of a bit cell, provided that no transition occurs less than one bit cell from another. Therefore, the initial transition required for a "0" following a "1" is skipped or delayed.

For decoding Miller encoded data it is convenient to use a clock having pulses at one half the bit cell interval. The timing of such clock is shown in line 13 of FIG. 3. Comparing the Miller encoded waveform of line 12 with the clock signal 13 reveals that the intervals between transitions of the waveform 12 expressed in terms of clock pulses 13 are equal to either "2", "3" or "4" as shown in line 14 of FIG. 3. That is, for an error-free waveform the intervals between successive transitions of the waveform are of short, intermediate or long duration related in the ratio of 2:3:4. It is convenient, therefore, to think of a Miller encoded waveform as consisting of a series of "2"-s, "3"-s, and "4"-s in terms of the one-half bit cell interval or double frequency clock. Analysis of Miller coding reveals that for any random sequence of encoded bits, the number of "3"-s occurring between any two "4"-s must always be even. It is this characteristic that forms the basis of the present invention. That is, if in decoding a Miller encoded data stream an odd number of "3"-s is encountered between successive "4"-s it signifies an error.

Figure 4:
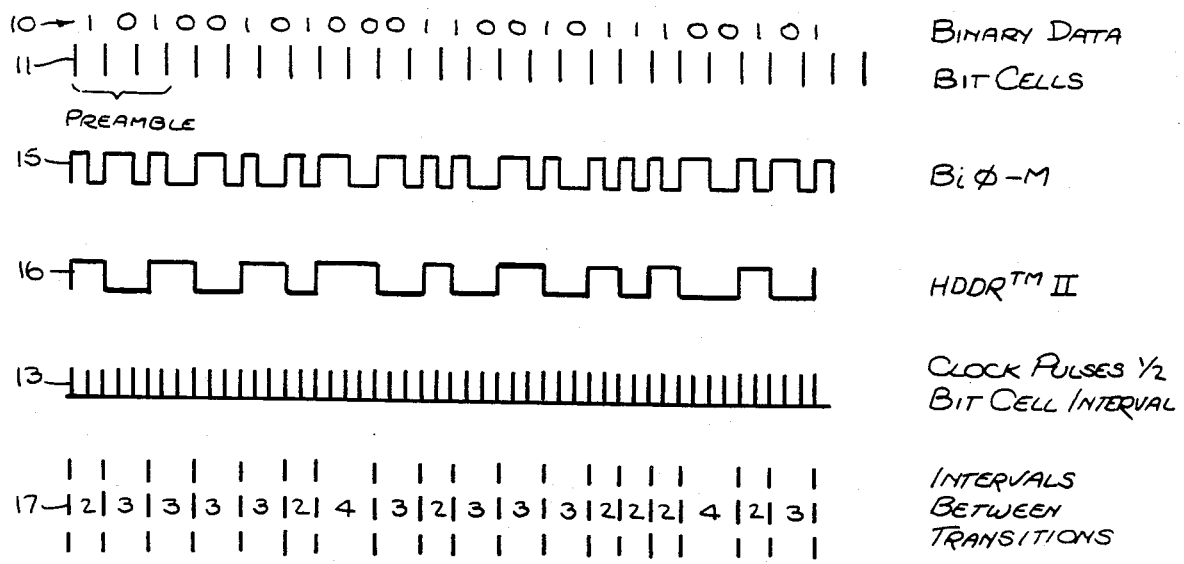
FIG. 4 is a series of waveforms for describing a particular type of double density code.

Another encoding scheme to which the subject error detection system is applicable is shown in FIG. 4. The data bit stream 10 and bit cell representation 11 is the same as in FIG. 3 for the sake of comparison. If the data stream 10 is encoded in bi-phase mark (Biφ-M) as shown in line 15 and a toggle circuit is caused to switch states in response to each positive going transition and to ignore the negative going transitions, there is produced a coded waveform 16. When waveform 16 is related to the double frequency clock pulses 13, the intervals between transitions will be defined as in line 17. For convenience in discussion the coded waveform 16 is identified as HDDR ™ II and has the same characteristic as Miller in that there are always an even number of "3"-s between "4"-s in an error-free signal.

While not illustrated herein, there are other types of coding, similar to the Miller code, that can be screened for errors by the present invention. The invention is applicable to a Modified Miller code in which a "1" has a transition in the middle of a bit cell while a zero has a transition at the start, but the skipped or delayed transition is that of the "1" when a "0" follows it. If the "1" and "0" definition of the Modified Miller code is reversed, the result is the "Wood" code. Wood coding produces the same waveform as the Miller code, but it occurs one half bit cell earlier. All of the Miller type double-density codes require a "preamble" containing one-zero-one transitions to enable the decoders to lock on the bit cell boundaries. More specifically, the decoding apparatus must detect a "4" in order to become synchronized with the encoded signal. In Miller, a one-zero-one sequence produces a "4".

Figure 1:
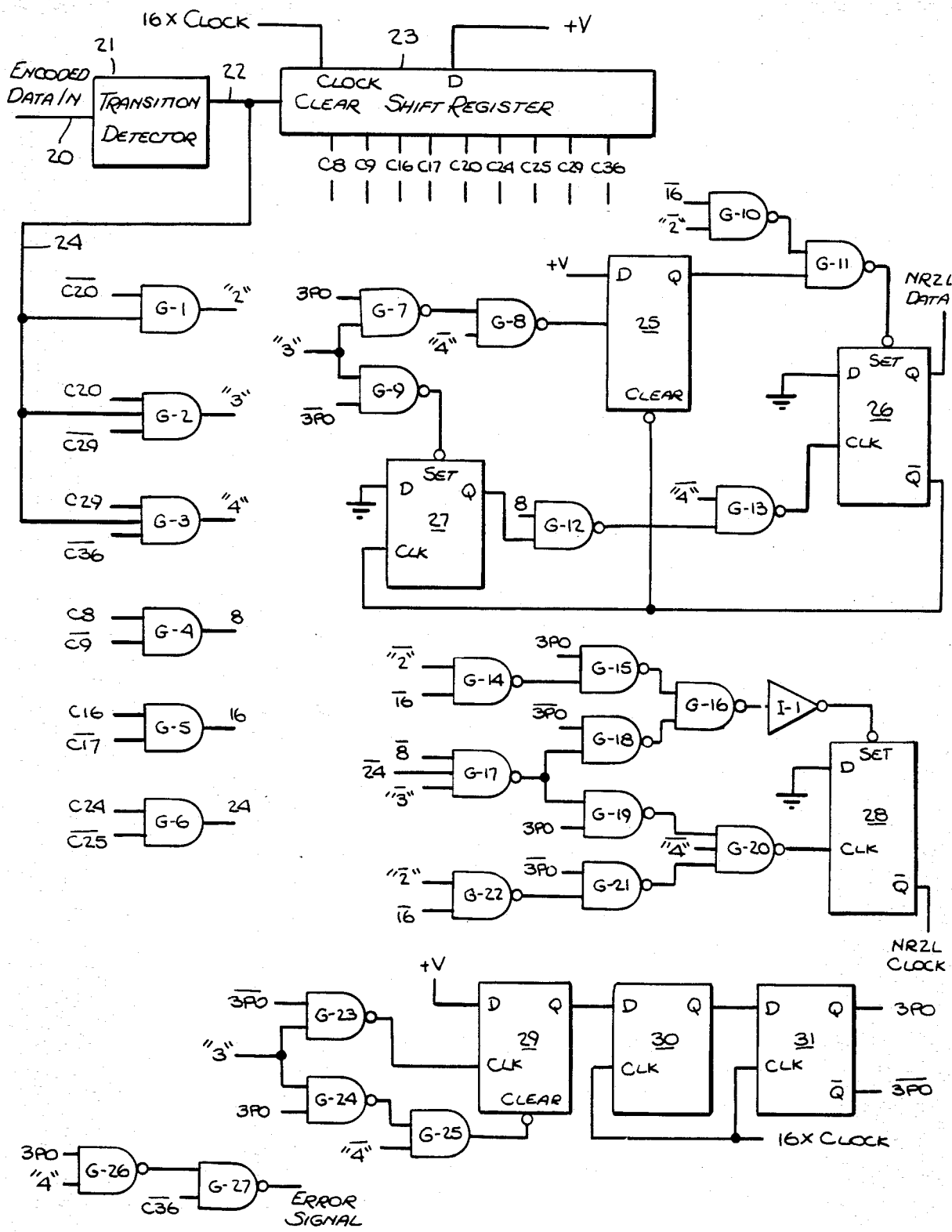
FIG. 1 is a logic diagram of decoding circuitry including the error detection circuitry of the present invention.

Referring now to FIG. 1, there is shown therein a system for processing a Miller encoded data stream and producing therefrom a non-return to zero level (NRZL) data signal, and NRZL clock signal, and, if such is the case, an error signal. The encoded data is fed at 20 to the input of a transition detector 21 of any known construction. The output from transition detector 21 is furnished over connection 22 to the CLEAR input of a shift register 23 whose data input, D, is connected to a positive voltage source or logical 1 input. The CLOCK input of register 23 is supplied from a "16×CLOCK" providing a pulse rate 16 times the data bit rate. The "16×CLOCK" signal can be produced and synchronized with the incoming waveform in any well-known manner. The shift register 23 is provided with a plurality of outputs designated C8, C9, C16, C17, C20, C24, C25, C29, and C36, corresponding, respectively, with counts of equal number. Thus, the various outputs of the shift register 23 will provide a time base for timing the intervals between successive transitions in the incoming encoded data as detected by the transition detector 21.

Figure 2:
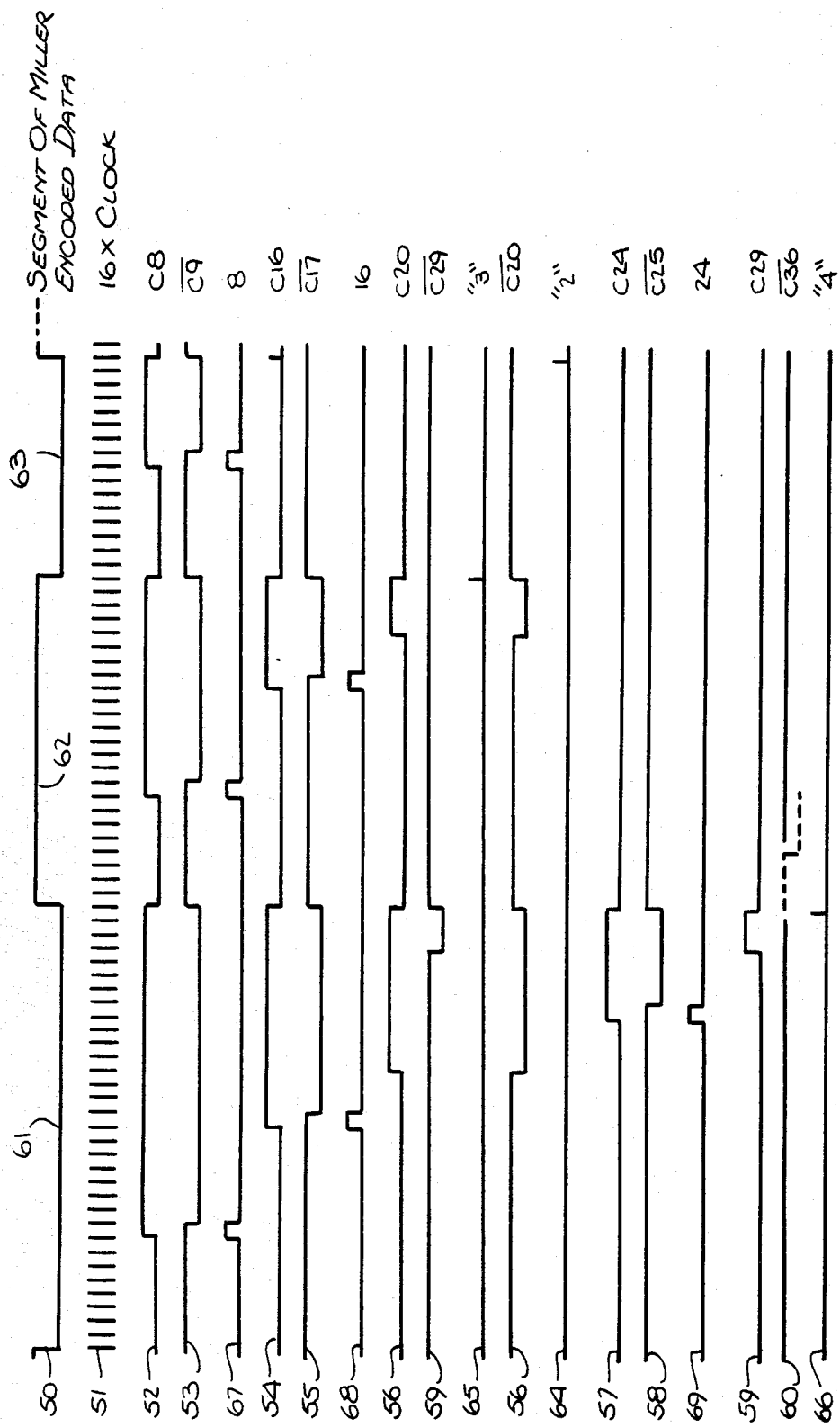
FIG. 2 is a series of waveforms for describing the operation of the circuit of FIG. 1.

For purpose of illustration, a segment of Miller encoded data is shown on line 50 in FIG. 2. Below it on line 51 is a representation of the "16×CLOCK" while on lines 52 to 60 are represented either the direct or indirect outputs corresponding, respectively, to the C8 through C36 outputs of the shift register 23 for the data 50. For example, if the shift register has been cleared initially, the output on C8 will shift from a logical 0 to a logical 1 at the eighth count from the "16×CLOCK" as shown on line 52. The C16 output similarly shifts at the sixteenth count as shown on line 54, and so forth.

It should be observed that the sample segment on line 50 is composed of a "4", "3" and "2" in that order, as shown at 61, 62 and 63, respectively. Consequently, between the transitions defining the portion 61 there appear outputs on each of C8 through C29. Since the transition between 61 and 62 is present, count C36 is not reached and the shift register is cleared to repeat its timing cycle. For the shorter intervals represented by 62 and 63, only the appropriate outputs manifest a change in a manner that should be readily understood.

Comparing FIG. 2 with FIG. 3 it will be apparent that each clock pulse on line 13 of FIG. 3 corresponds to eight clock pulses on line 51 in FIG. 2. That is, output C8 of the shift register 23 marks the one-half bit cell interval.

Returning to FIG. 1, the outputs from the shift register 23 are furnished, as indicated by conventional nomenclature, to a series of six gates G-1, G-2, G-3, G-4, G-5 and G-6. The gates G-1, G-2 and G-3, are additionally supplied with the output from the transition detector 21 over connections 22 and 24. Thus, if detector 21 produces an output before the shift register 23 reaches a count of twenty, a "2" pulse will appear at the output of gate G-1. See line 64 in FIG. 2.

If the detected transition appears between the counts of 20 and 29, a "3" pulse will appear at the output of gate G-2. See line 65 in FIG. 2.

Finally, if the detected transition appears between the counts of 29 and 36, a "4" pulse will appear at the output of gate G-3. See line 66 in FIG. 2.

Gates G-4, G-5 and G-6 produce respective timing pulsess at the counts of 8, 16 and 24, respectively, as shown respectively on lines 67, 68 and 69 in FIG. 2.

For the purpose of further processing the signals to extract the NRZL Data there are provided a series of D-flip-flops 25, 26 and 27 interconnected with each other and with gates G-1 through G-5 and G-7 through G-13, as shown. It should be understood that like numbered leads are interconnected either directly or through an inverter. For example, the output from gate G-3 is inverted and fed to the respective input of both gates G-8 and G-13.

The NRZL CLOCK signal is extracted by another D-flip-flop 28 connected to inverter I-1 and to gates G-14 through G-22, all as shown.

Incidental to the decoding process, it is necessary to "count" the number of "3"-s and this is accomplished by the series of D-flip-flops 29, 30 and 31 interconnected, as shown, with gates G-23, G-24 and G-25. The clock inputs of flip-flops 30 and 31 are connected to the "16×CLOCK" and function as a shift register to transfer the state of flip-flop 29, i.e., the signal at its Q output, with a brief delay, to the Q and $\overline{Q}$ outputs of flip-flop 31, labled, respectively, 3PO and $\overline{3PO}$. As noted in the drawing, the 3PO output is connected to inputs of gates G-7, G-15, G-19 and G-24, as well as to an input of a gate G-26 for a purpose to be described. The $\overline{3PO}$ output from flip-flop 31 is similarly connected to gates G-9, G-18, G-21 and G-23.

Finally, gate G-26 has a second input connected to the "4" output of gate G-3, and has its output connected to one input of a gate G-27. The output C36 from the shift register 23, after inversion, is connected to the second input of gate G-27. As shown, the error signal is obtained at the output of gate G-27.

In this example, gates G-1 through G-6, and G-25 are AND gates while all the others are NAND gates.

Assuming errorless detection of the Miller encoded waveform 12 of FIG. 3, the 3PO and $\overline{3PO}$ outputs of flip-flop 31 will be as shown on lines 70 and 71. The NRZL Data at the Q output of flip-flop 26 will be as shown on line 72 while the NRZL clock output at $\overline{Q}$ of flip-flop 28 will be as shown on line 73.

If for some reason a transition in the encoded waveform should appear at an incorrect point such as shown within the circle 74 on line 75, the 3PO signal will now appear as shown on line 76. Because the transition within circle 74 has been delayed and appears now as a "4" instead of a "3", the "4" pulse at gate G-26 will coincide with a logical 1 at 3PO causing a logical 0 to be applied to gate G-27 which furnishes a logical 1 at its output as the error signal. See line 77 in FIG. 3. It should be understood that the occurrence of a count of 36 will also generate an error signal.

All of the components in FIG. 1 with the exception of gates G-26 and G-27 are required to decode the Miller encoded data. Therefore, by the addition of just two NAND gates, namely gates G-26 and G-27, error detection is provided.

By way of summation, the signals at the outputs of gates G-1, G-2 and G-3 are indicative of the intervals between successive transitions of the waveform being decoded, which intervals for an error-free waveform are of short, intermediate or long duration related in the ratio of 2:3:4. The flip-flops 29, 30 and 31 constitute means having a first and a second operable state coupled to alternate between said states responsive to each detection in the incoming waveform of a transition interval corresponding to said intermediate duration. By feeding the "4" signal through gate G-25 to the CLEAR input of flip-flop 29 the latter is steered to a selected condition every time a "4" output appears from gate G-3. This means ensures that the flip-flops 29, 30 and 31 are in a first or starting state in response to each detection in the incoming waveform of a transition interval corresponding to the long duration. Whenever the flip-flops 29, 30 and 31 are in their second state at the time of detection of a transition interval corresponding to said long duration, the gates G-26 and G-27 will provide an error signal.

The gates G-23 and G-24 constitute routing means coupled responsively to the delayed output, namely to 3PO and $\overline{3PO}$, for feeding input signals, the "3" signal, alternately to the clock and clear inputs of flip-flop 29. Gate G-25 constitutes additional means that functions as an OR circuit and is interposed between the clear input of flip-flop 29 and the routing means.

Having described the presently preferred embodiment of the present invention it should be understood by and readily apparent to those skilled in the subject art that numerous changes in construction can be introduced without departing from the true spirit of the invention as defined in the appended claims.

What is claimed is:

1. A real-time error detection system for double density Miller or similarly encoded binary data wherein during decoding of the waveform containing said data, signals are generated indicative of the intervals between successive transitions of said waveform, which intervals for an error-free waveform are of short, intermediate or long duration related in the ratio of 2:3:4, said error detection system comprising in combination first means for providing said signals indicative of the interval between successive transitions of a waveform, second means for applying a waveform to be decoded to said first means, thrid means having a first and second operable state, said third means having an input coupled to an output of said first means which contains said signals indicative of an intermediate interval for responding to each of said signals indicative of an intermediate interval by alternating between said states, said third means also having an input coupled to an output of said first means which contains said signals indicative of a long interval for responding to each of said signals indicative of a long interval by assuming said first operable state, and fourth means coupled to outputs of said first and third means for providing an error signal each time said third means is in said second state when said first means provides a signal indicative of a long interval.

2. A system according to claim 1, characterized in that said fourth means includes means for providing an error signal whenever the signals from said first means indicate that a waveform transition has not been detected within a predetermined interval after the detection of the preceding transition where said predetermined interval exceeds said long duration.

3. A system according to claim 1, characterized in that said fourth means comprises a NAND gate having a first input coupled to said output of said third means for receiving a signal representative of the state of said third means, a second input for said NAND gate, said second input being coupled responsively to an output of said first means which contains said signals indicative of a long interval, and an output from said NAND gate for providing said error signal.

4. A system according to claim 3, characterized in that said fourth means comprises a further NAND gate having an output, one input connected to said output of the first mentioned gate, and a second input connected responsively to said first means for producing said error signal at its said output whenever the signals from said first means indicate that the interval between successive transitions of said waveform exceeds a predetermined duration in excess of said long duration.

5. A system according to claim 1, characterized in that said third means comprises a plurality of flip-flops interconnected as a shift register with the first flip-flop functioning as an input, and with clock pulses being furnished to the subsequent flip-flops such that said subsequent flip-flops provide at an output a delayed output signal indicative of the status of said first flip-flop, signal routing means coupled to said output of said subsequent flip-flops for receiving said delayed output signal and responding thereto for feeding input signals alternately to the clock and clear inputs of said first flip-flop as a function of said delayed output signal, input means for said signal routing means which input means is coupled, for receiving said input signals, to an output of said first means which contains said signals indicative of said intermediate interval, and means connecting a data input of said first flip-flop to a source of fixed voltage for causing said first flip-flop to become set when a clock signal is applied to its clock input.

6. A system according to claim 5, characterized in that additional means functioning as an OR circuit and having at least a first output and a first and second input is interposed with said first output coupled to said clear input of said first flip-flop and with said first input coupled to said routing means, said second input of said OR circuit being coupled to an output of said first means which contains said signals indicative of said long interval.

7. A system according to claim 5, characterized in that said output of said subsequent flip-flops and said output of said first means which contains said signals indicative of said intermediate intervals are both coupled to provide inputs to means for decoding said encoded waveform to produce at an output an NRZL signal.

* * * * *